(12) United States Patent
Reynolds

(10) Patent No.: US 8,009,409 B2
(45) Date of Patent: *Aug. 30, 2011

(54) ELECTROCHEMICAL CAPACITOR

(75) Inventor: Thomas A. Reynolds, Bend, OR (US)

(73) Assignee: Integrated Resources Recovery, Inc., San Mateo, CA (US)

( * ) Notice: Subject to any disclaimer, the term of this patent is extended or adjusted under 35 U.S.C. 154(b) by 615 days.

This patent is subject to a terminal disclaimer.

(21) Appl. No.: 12/058,772

(22) Filed: Mar. 31, 2008

(65) Prior Publication Data

US 2009/0244810 A1    Oct. 1, 2009

(51) Int. Cl.
*H01G 9/00* (2006.01)
(52) U.S. Cl. ........................................ 361/502; 428/402
(58) Field of Classification Search .................. 361/502, 361/503
See application file for complete search history.

(56) References Cited

U.S. PATENT DOCUMENTS

| 5,953,204 | A * | 9/1999 | Suhara et al. | 361/502 |
| 6,917,094 | B2 * | 7/2005 | Murakami et al. | 257/532 |
| 7,206,190 | B2 * | 4/2007 | Murakami et al. | 361/502 |
| 2005/0225929 | A1 * | 10/2005 | Murakami et al. | 361/502 |
| 2005/0231891 | A1 * | 10/2005 | Harvey | 361/502 |
| 2005/0231893 | A1 * | 10/2005 | Harvey | 361/502 |

* cited by examiner

*Primary Examiner* — Eric Thomas
(74) *Attorney, Agent, or Firm* — David E. Lovejoy

(57) ABSTRACT

An electroactive material for charge storage and transport in an electrochemical capacitor. The material is formed of a plurality of nanocomponents including nanoparticles, in turn formed of conductive carbon-based clusters bound together by a conductive carbon-based cluster binder including nanoclusters and nanocluster binders, all having high densities of mobile charge carriers (electrons, electronic acceptors, ionic species). A terminal is electrically coupled to the nanoparticles for charge transport.

19 Claims, 8 Drawing Sheets

ELECTROCHEMICAL CAPACITOR

TECHNICAL FIELD

The present invention relates to electrodes and electrochemical devices having electrodes that undergo electrochemical reactions and particularly to nanomaterial electrodes and devices.

BACKGROUND OF THE INVENTION

Nanomaterials are materials that include components with nanometer dimensions, for example, where at least one dimension is less than 100 nanometers. Examples of such materials are allotropes of carbon such as nanotubes or other carbon fullerenes and components of carbon char. Carbon black was an early use of nanomaterials in tire manufacturing. Other nanomaterials include inorganic materials such as metal sulfides, metal oxides and organic materials. Because of the small dimensions, nanomaterials often exhibit unique electrical and electrochemical properties and unique energy transport properties. These properties are most pronounced when high surface areas are present and when charge transport mechanisms exist in the nanomaterials.

Some nanomaterials are manufactured using rigorous processing steps that are expensive and commercially unattractive. Some nanomaterials occur naturally or incidentally in commercial processing steps. Naturally or incidentally occurring nanomaterials tend to be highly irregular in size and composition because the environment in which they are produced is not adequately controlled for the production of nanomaterials. Processing methods that produce nanomaterials include among others, liquid-phase steps, gas-phase steps, grinding steps, size-reduction steps and pyrolysis steps.

Pyrolysis is the heating of materials in the absence of oxygen to break down complex matter into simpler molecules and components. When carbon based materials are pyrolyzed, the process of carbonization can occur leading to an ordered state of semi-graphitic material. When carbon based materials are pyrolyzed in uncontrolled conditions, a large amount of randomly ordered carbon material results. When both carbon and inorganic materials are present, pyrolysis under controlled conditions can lead to highly useful and unique results. An example of a use of pyrolysis is for the break down of used tires (typically from automobiles, trucks and other vehicles). The pyrolysis of tires results in, among other things, a carbon/inorganic residue called char.

The composition of char from tire pyrolysis is determined by the materials that are used to manufacture tires. The principal materials used to manufacture tires include rubber (natural and synthetic), carbon black (to give strength and abrasion resistance), sulfur (to cross-link the rubber molecules in a heating process known as vulcanization), accelerator metal oxides (to speed up vulcanization), activation inorganic oxides (principally zinc oxide, to assist the vulcanization), antioxidant oxides (to prevent sidewall cracking), a textile fabric (to reinforce the carcass of the tire) and steel belts for strength. The carbon black has a number of carbon structures including graphitic spheroids with nanometer dimensions, semi graphitic particles and other forms of ordered carbon structures.

In summary, the manufacture of tires initially mixes the materials to form a "green" tire where the carbons and oxides form a homogenous mixture. The "green" tire is transformed into a finished tire by the curing process (vulcanization) where heat and pressure are applied to the "green" tire for a prescribed "cure" time. The carbon materials used in "green" tires are typically as indicated in TABLE 1:

TABLE 1

| DESIGNATION | SIZE (nm) |
|---|---|
| N110 | 20-25 |
| N220 | 24-33 |
| N330 | 28-36 |
| N300 | 30-35 |
| N550 | 39-55 |
| N683 | 49-73 |

When tires are discarded, they are collected for pyrolysis processing to reclaim useful components of the tires. In general, tire pyrolysis involves the thermal degradation of the tires in the absence of oxygen. Tire pyrolysis has been used to convert tires into value-added products such as pyrolytic gas (pyro-gas), oils, char and steel. Pyrolysis is performed with low emissions and other steps that do not have an adverse impact on the environment. The basic pyrolysis process involves the heating of tires in the absence of oxygen. To enhance value, the oils and char typically under go additional processes to provide improved products.

In electrochemical capacitors, electrical charge is stored on the surface of an electrically conductive electrode material. The capacitance arises by separation of electrons at the electrode surface and ionic charges in the electrolyte solution. Because the charge separation arises over only a distance of 0.1 to 10 nanometers, large specific capacitances can be achieved on the order of 10-20 microfarads per square centimeter of electrode material. The larger the surface area of the electrode material, the greater the charge that can be stored. Since the capacitance, or the amount of charge that an electrochemical capacitor can hold, is directly related to the surface area of the electrodes, electrodes made from conductive materials with high surface areas are preferred. Devices incorporating such electrodes are referred to as double layer capacitors or supercapacitors.

Electrochemical capacitors are charge-storage devices that are capable of delivering high power densities and that are capable of being cycled (charged and discharged) millions of times, hence demonstrating a significant advantage over conventional batteries. Electrochemical capacitors have energy and power capabilities that lie between the capabilities of a battery and of a conventional capacitor (electrolytic, thin film and others).

There is substantial demand for a rechargeable energy source that can provide high power and energy densities, can be charged quickly, has a high cycle life is environmentally benign and cost effective. Double layer capacitors, especially when used in conjunction with batteries, are rechargeable charge storage devices that fulfill this need.

In prior art capacitors, the production of activated carbon is an energy intensive process that first includes heating of a precursor material (natural or synthetic) to form a carbon powder or carbon fiber, in many cases requiring temperatures up to 3000° C. Next, to form activated carbon, the material is heated to about 800° C. in an atmosphere of steam or carbon dioxide, or electrochemical reaction in a strongly oxidizing solutions (such as Hummers reagent) to produce a carbon with high surface area to provide high energy density and high power density. Overall, the yield for activated carbons is generally not better than 25% based on weight of the precursor material.

A single cell double-layer capacitor consists of two electrodes which store electrical charge (called the active materials), separated by an ion permeable but electrically insulating membrane. Each electrode is also in contact with a current collector which provides for electrical contact outside of the cell. The electrodes and membrane are infused with an electrolyte and enclosed in an inert housing which provides a sealed environment and also enough compression to reduce contact resistance between the different layers. Multiple cells may be used in series to increase the allowable potential (voltage), and also in parallel to increase the capacitance.

Applying an electrical potential across the electrodes causes charge to build up in the electrochemical double layer that exists at the electrode/electrolyte interface for each electrode. This process continues until a state of equilibrium is reached, so that the potential of the electrodes is at the charging potential and the current is reduced to that required to maintain the charge.

Because carbon is relatively chemically inert, has a high electrical conductivity, is environmentally benign, and is relatively inexpensive, some forms of carbon are excellent materials for fabricating electrodes. However, many forms of carbon are not suitable for electrodes. The desired properties of the electrochemical capacitor electrodes include the following high surface area, electrically conductive, low cost, readily available source of material and long-term stability under operating conditions.

Advances are being made in electrochemical capacitor technology research using nanomaterials. While capacitors of many types are known, there is a need for improved electrodes based on nanomaterials and for new electrochemical capacitors using the new nanomaterials.

SUMMARY

The present invention is an electroactive material for charge storage and transport in an electrochemical capacitor. The material is formed of a plurality of nanocomponents including nanoparticles, in turn formed of conductive carbon-based clusters bound together by a conductive carbon-based cluster binder including zinc sulfide nanoclusters and nanocluster binders, all having high densities of mobile charge carriers (electrons, electronic acceptors, ionic species). A terminal is electrically coupled to the nanoparticles for charge transport.

The material and each of the nanocomponents play key roles in the process of charge transport including supplying electrons and electron acceptor sites. The charge transport occurs by the electron travel through the highly conductive and relatively short path of the binders with proximity to the nanoclusters. The small sizes of the particles provide large surface areas. In general, particle sizes of less than about 100 nanometers are preferred in order to have large surface areas which provide ready access of the electrolyte to the nanocomponents of the particles. The combination of the high density of available electrons in all the nanocomponents of the particles with the short distances among all the nanocomponents of the particles and the large surface areas of the nanocomponents greatly enhances the energy and power densities achieved.

Because of the short nanodistances of the particles, the density of clusters producing electrons tends to be high resulting in high energy densities. Because of the short nanodistances of the particles, the intercalation rate is fast resulting in high power densities, for example, greater than 1000 watts/kilogram. In a further embodiment, a second electroactive material is provided for charge transport. The second material is formed of a second plurality of nanocomponents including second nanoparticles, in turn formed of conductive carbon-based clusters bound together by a conductive carbon-based cluster binder including nanoclusters and nanocluster binders, all having high densities of mobile charge carriers (electrons, electronic acceptors, ionic species). A second terminal is electrically coupled to the nanoparticles for charge transport.

In a further embodiment, the second plurality of particles are substantially the same as the first plurality of particles including zinc sulfide nanoclusters.

In a further embodiment, the second plurality of particles are substantially different from the first plurality of particles including zinc sulfide nanoclusters.

In a further embodiment, the zinc sulfide nanoclusters are charge receptors and wherein charge transport uses electrolyte ions.

In a further embodiment, the second plurality of particles are separated from the first plurality of particles by an ion permeable membrane.

In a further embodiment, the carbon nanosphere cores have diameters of less than approximately 100 nanometers.

The electroactive material of claim 2 wherein the composite layer has a wall thickness of less than approximately 1200 nanometers.

In a further embodiment, a substantial number of the clusters have diameters of less than approximately 1200 nanometers.

The foregoing and other objects, features and advantages of the invention will be apparent from the following detailed description in conjunction with the drawings.

DETAILED DESCRIPTION

Figure 1:
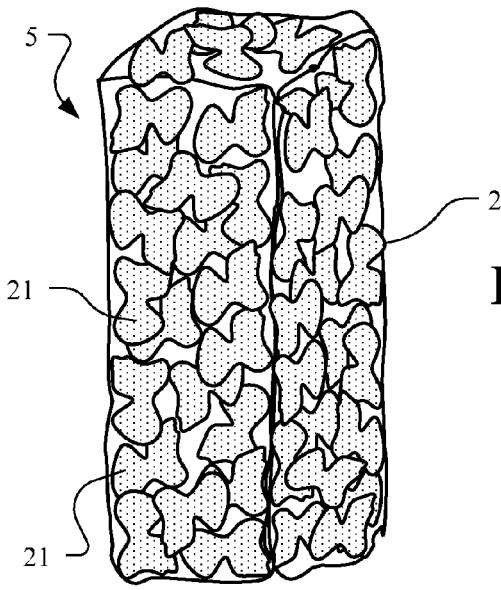
FIG. 1 is a schematic representation of material formed of particles including composites having nanoclusters.

The electrode materials used in electrochemical capacitors serve multiple concurrent functions by acting both as a battery and an electrochemical capacitor with tunable power and energy capabilities. The cost of the carbon-based electrode materials is substantially reduced through use of materials derived from tire pyrolysis. These nanosized carbon-based materials are preferred materials for the electrodes in electrochemical capacitors due to their large surface areas and high charge densities. The large surface areas and high charge densities are accessible to the charge carrying electrolyte ions. Highly accessible surface areas and high charge densities are important for high energy density and high power density.

The char obtained from the pyrolysis of tires is an inexpensive source of nanomaterials that, with further control and added processing, are potentially useful in many fields including Photo Catalysts, Contact Catalysts, Capacitors, Batteries, Sorbents (Adsorbents and Absorbents) and Photo Voltaic Materials. The ability to use nanomaterials derived from char in useful applications is dependent on controlling the parameters of the tire pyrolysis process and the processing of char for particular applications.

One particular application of processed char is for electrodes that are used in batteries, electrochemical capacitors and other devices. In general, electrodes undergo reactions that take place in a solution at the interface of an electron conductor (electrode) and an ionic conductor (electrolyte). Electrons transfer between the electrode and the electrolyte or species in solution. Typical electrolytes include aqueous, organic, inorganic and polymeric.

The electron transfer can occur at an electrode through the release of chemical energy to create an internal voltage or through the application of an external voltage. Electrochemical reactions transfer electrons between atoms or molecules. These reactions can be separated in space and time and devices with such reactions are often connected to external electric circuits. The creation of internal voltages at electrodes is useful in electrochemical capacitors.

One example of batch pyrolysis uses a furnace/retort, a three stage condensing system, a water scrubber, and a flare. An oil tank collects the condensed oil at the end of each test. The furnace uses two burners. The operating temperature of the furnace is set at 1,750° F. with a control range of plus/minus 30 to 40° F. When the control temperature is reached, one burner is shut off continuing with a small upward drift in temperature. When the temperature drifts down, the burner restarts automatically. Both burners are on for the first 90 minutes. Burner cycle time after the start of the run is a few seconds; near the end of the run, one burner is off for period as long as three minutes with a like interval of being on. Exhaust gas temperature remains relatively stable between 1,250 and 1380° F. Pyro gas generation starts after 105 minutes of operation at a temperature of 650° F., reached a high of 700° F., and dropped to 375° F. at the end of the thermal cycle.

The control of the temperatures and the control of the heating and cooling rates during pyrolysis are critical for producing the nanocomponents having the nano structures of the present invention.

The thermal operation is monitored using the back pressure in the retort, the cooling water temperature, and visually watching the flare. A run lasts approximately 16 hours. At the end of the run, the furnace back pressure is almost atmospheric, the cooling water delta temperature is almost zero, and the flare is out. During this operational period, the ambient air temperature ranged from about 20 to 45° F. The retort is opened approximately 8 hours after the thermal cycle is shut down. The estimated temperature of the char is less than 350° F. Prior to opening the retort, the retort is purged with nitrogen for a brief period of time. After the lid is opened, a very small quantity of vapor comes from the remaining char and tire wire. Cooling water flow (rate and temperature) is monitored as a check of the process gas generation rate and the condensing duty for both the condensable and non-condensable fraction of the process gas produced. When the inlet and outlet temperatures of the cooling water measures about the same, the operation is complete. The operating pressure of the retort ranges from two to eight millibars above atmospheric, which is sufficient to transport the gas through the condensing system to the flare. For the example described, the tire charge was 3,400 pounds in eight bales. The eight bales averaged 15 tires, with an average weight of 28 pounds per tire. The output yield of char was approximately 25% or more of the tire input.

After pyrolysis of tires, the composition of char, for one typical example, includes carbon as previously indicated in TABLE 1 and includes inorganic materials, such as metal sulfides and metal oxides, as indicated in the following TABLE 2:

TABLE 2

| MATERIAL | FORMULA | x RANGE |
|---|---|---|
| Aluminum oxide (Al) | $Al_2O_{(3-x)}S_x$ | 0 to 3 |
| Barium oxide (Ba) | $BaO_{(1-x)}S_x$ | 0 to 3 |
| Bismuth oxide (Bi) | $Bi_2O_{(3-x)}S_x$ | 0 to 3 |
| Calcium oxide (Ca) | $CaO_{(1-x)}S_x$ | 0 to 1 |
| Chromium oxide (Cr) | $Cr_2O_{(3-x)}S_x$ | 0 to 3 |
| Iron oxide (Fe) | $Fe_2O_{(3-x)}S_x$ | 0 to 3 |
| Iron oxide (Fe) | $FeO_{(2-x)}S_x$ | 0 to 2 |
| Lead oxide (Pb) | $FeO_{(1-x)}S_x$ | 0 to 1 |
| Magnesium oxide (Mg) | $MgO_{(1-x)}S_x$ | 0 to 2 |
| Manganese oxide (Mn) | $Mn_2O_{(3-x)}S_x$ | 0 to 3 |
| Molybdenum oxide (Mo) | $Mo_2O_{(3-x)}S_x$ | 0 to 3 |
| Molybdenum oxide (Mo) | $MoO_{(2-x)}S_x$ | 0 to 2 |
| Phosphorous oxide (P) | $P_2O_{(5-x)}S_x$ | 0 to 5 |
| Potassium oxide (K) | $K_2O_{(1-x)}S_x$ | 0 to 1 |
| Silicon oxide (Si) | $SiO_{(2-x)}S_x$ | 0 to 2 |
| Sodium oxide (Na) | $Na_2O_{(1-x)}S_x$ | 0 to 2 |
| Strontium oxide (Sr) | $SrO_{(1-x)}S_x$ | 0 to 1 |
| Titanium oxide (Ti) | $Ti_2O_{(3-x)}S_x$ | 0 to 3 |
| Titanium oxide (Ti) | $TiO_{(2-x)}S_x$ | 0 to 2 |
| Zinc oxide (Zn) | $ZnO_{(1-x)}S_x$ | 0 to 1 |
| Other Metal oxides (trace) | | |
| Pyrolitic Carbon | $C_{6m}C_n$ | m > n (aromatic) |

The combination of TABLE 1 materials and TABLE 2 materials as produced by the pyrolysis process form nanomaterial composites useful in many fields including Photo Catalysts, Contact Catalysts, Capacitors, Batteries, Sorbents (Adsorbents and Absorbents) and Photo Voltaic Materials.

The TABLE 2 materials are "heavy metal free" in that even if trace amounts of heavy metals were produced as a result of tire pyrolysis, the trace amounts are so small that no environmental hazard is presented.

In FIG. 1, the material 5 includes nanomaterial in the form of particles 21 derived from char in the manner previously described. Typically, the char is processed for size reduction, sorting, classification and other attributes to form the char particles 21.

Figure 2:
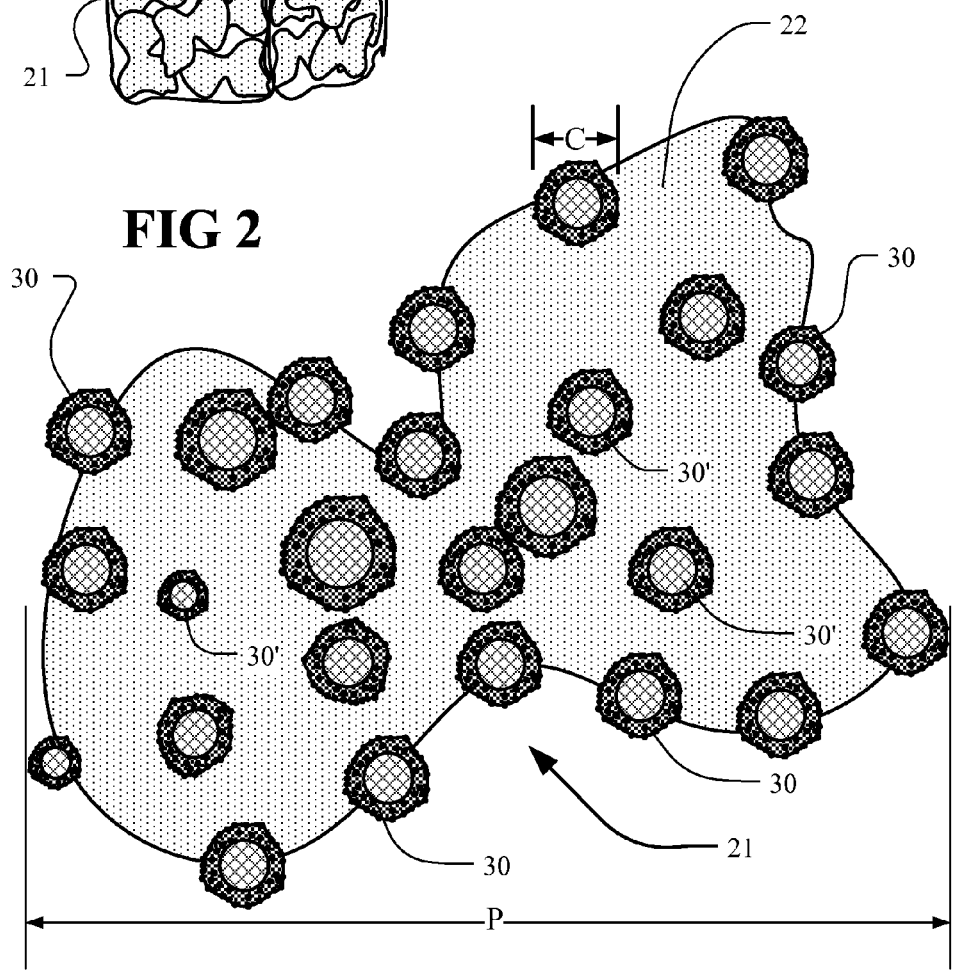
FIG. 2 depicts a schematic representation of a typical particle of the FIG. 1 material including composites having nanoclusters.

In FIG. 2, a schematic representation of a particle 21 is shown that is typical of the particles 21 in the material 5 of FIG. 1. In embodiments where the material 5 is used in an electrode, the particles 21 of FIG. 1 typically have at least one dimension, P, in a range from approximately 10 nm to approximately 10,000 nm. In FIG. 2, the particle 21 includes a plurality of clusters 30 that are held together by a cluster binder 22. The material of the cluster binder 22 primarily contains components of TABLE 1 and TABLE 2.

In the particle 21, a number of the clusters 30 are externally located around the periphery of the particle 21 and a number of the clusters 30, designated as clusters 30', are located internally away from the periphery of particle 21. The internally located clusters 30' are loosely encased by the cluster binder material 22. The selection of particle sizes in a range from approximately 50 nm to approximately 1000 nm tends to optimize the number of active and externally located clusters 30 and thereby enhances the electrochemical operations of the electrodes. The internally located clusters 30' are efficiently coupled electrically and through intercalation.

Figure 3:
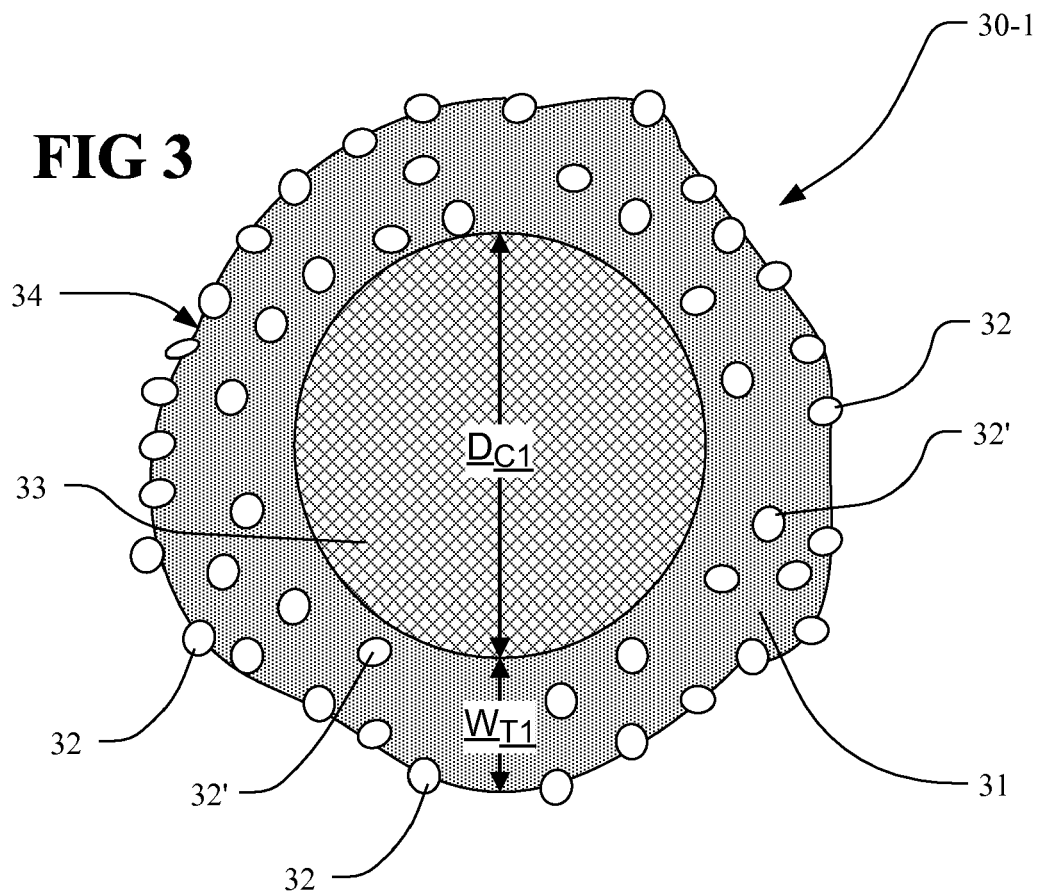
FIG. 3 depicts a schematic representation of a typical composite having zinc sulfide nanoclusters.

In FIG. 3, a schematic representation is shown of a cluster 30-1 that is typical of one embodiment of clusters 30 of FIG. 2. The cluster 30-1 has a graphitic carbon nanosphere cores 33 encased by a composite layer 34. The carbon nanosphere core 33 is generally spherical in shape (a nanosphere) and has a core diameter, $D_{C1}$, in a range from approximately 10 nanometers to approximately 1000 nanometers. The composite layer 34 has a wall thickness, $W_{T1}$, in a range from approximately 0.2 nanometers to approximately 300 nanometers. The overall diameter of the cluster 30-1 ($D_{C1}+W_{T1}$) in a range from approximately 10 nanometers to approximately 1300 nanometers.

In FIG. 3, the size and shape of the carbon nanosphere cores 33 are limited primarily by the size and the shape of the cores used in the mixture forming the "green" tires as indicated in TABLE 1. The melting point of graphite is approximately in the range from 1900° C. to 2800° C. Since both the vulcanization and the pyrolysis processes operate at much lower temperatures, the carbon nanosphere cores 33 in finished tires and in tire char remain essentially undisturbed from their original size and shape.

In FIG. 3, the composite layers 34 surrounds and incases the carbon nanosphere cores 33. The sizes and the shapes of the composite layers 34 are determined in part by the sizes and the shapes of the carbon nanosphere cores 33 and additionally by the processing of the tire char. The processing of the char is done so as to achieve the 0.2 nanometers to approximately 300 nanometers for the wall thickness, $W_{T1}$, and so as to achieve the overall diameter, ($D_{C1}+W_{T1}$), of the clusters 30-1 in a range from approximately 10 nanometers to approximately 1300 nanometers.

In FIG. 3, the composite layer 34 is carbon and contains a mixture of metal oxides and metal sulfides of TABLE 2 and other materials as described in TABLE 1, surrounding and bound to the carbon nanosphere core 33. Specifically, the composite layer 34 includes zinc sulfide nanoclusters 32 embedded in and forming part of the composite layer 34. A number of the nanoclusters 32 are externally located, that is, located around the periphery of the cluster 30-1 and a number of the nanoclusters 32, designated as nanoclusters 32', are located internally away from the periphery of the composite layer 34. The composition of the composite layer 34 typically has zinc sulfide (ZnS) in a range, for example, of 2% to 20% by weight, and carbon and other components of TABLE 2.

Figure 4:
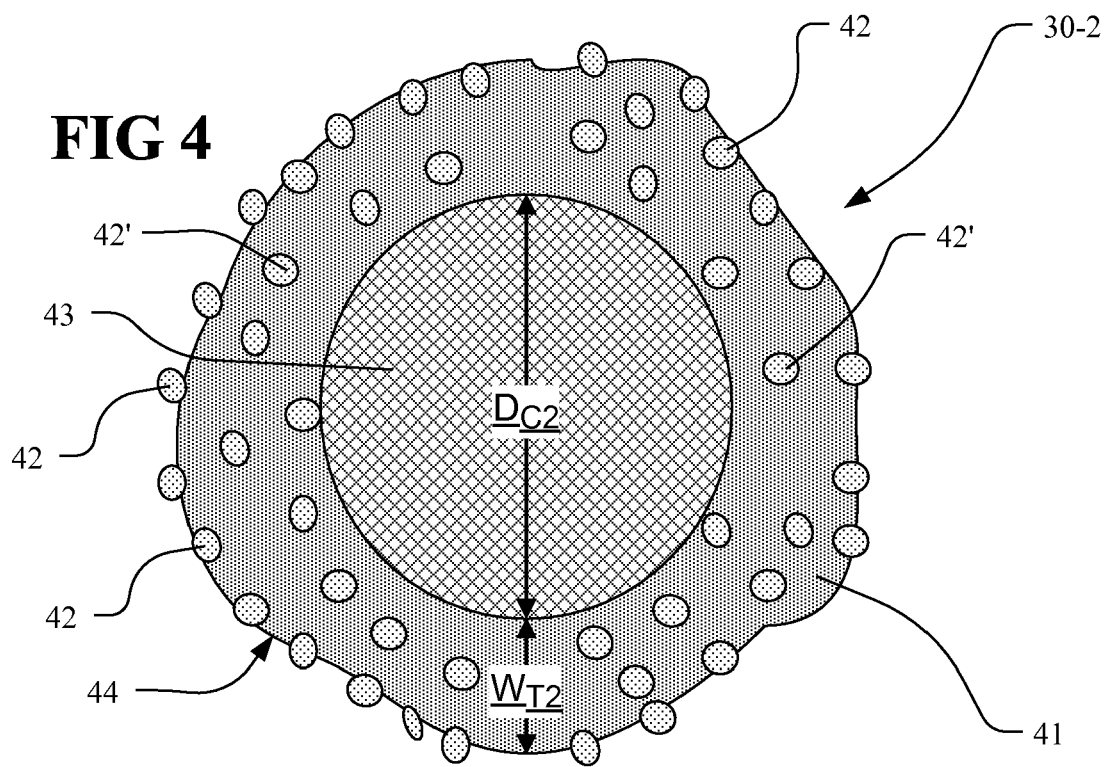
FIG. 4 depicts a schematic representation of a typical composite having zinc nanoclusters.

In FIG. 4, a schematic representation is shown of a cluster 30-2 that is typical of one embodiment of clusters 30 of FIG. 2. The cluster 30-2 has a carbon nanosphere core 43 encased by a composite layer 44. The carbon nanosphere core 43 is generally spherical in shape (a nanosphere) and has a core diameter, $D_{C2}$, in a range from approximately 10 nanometers to approximately 1000 nanometers. The composite layer 44 has a wall thickness, $W_{T2}$, in a range from approximately 0.2 nanometers to approximately 300 nanometers. The overall diameter of the cluster 30-2 ($D_{C2}+W_{T2}$) in a range from approximately 10 nanometers to approximately 1300 nanometers.

In FIG. 4, the size and shape of the carbon nanosphere cores 43 are limited primarily by the size and the shape of the cores used in the mixture forming the "green" tires as indicated in TABLE 1. The melting point of graphite is approximately in the range from 1900° C. to 2800° C. Since both the vulcanization and the pyrolysis processes operate at much lower temperatures, the carbon nanosphere cores 43 in finished tires and in tire char remain essentially undisturbed from their original size and shape.

In FIG. 4, the composite layers 44 surrounds and incases the carbon nanosphere cores 43. The sizes and the shapes of the composite layers 44 are determined in part by the sizes and the shapes of the carbon nanosphere cores 43 and additionally by the processing of the tire char. The processing of the char is done so as to achieve the 0.25 nanometers to approximately 80 nanometers for the wall thickness, $W_{T2}$, and so as to achieve the overall diameter, ($D_{C2}+W_{T2}$), of the clusters 30-2 in a range from approximately 5 nanometers to approximately 100 nanometers.

In FIG. 4, the composite layer 44 is a mixture of metal oxides and metal sulfides of TABLE 2 and other materials as described in TABLE 1, surrounding and bound to the carbon nanosphere core 43. Specifically, the composite layer 44 includes zinc sulfide nanoclusters 42 embedded in and forming part of the composite layer 44. A number of the nanoclusters 42 are externally located, that is, located around the periphery of the cluster 30-2 and a number of the nanoclusters 42, designated as nanoclusters 42', are located internally away from the periphery of the composite layer 44. The composition of the composite layer 44 typically has zinc sulfide (ZnS) in a range from approximately 2% to approximately 20% by weight, carbon in a range from approximately 60% to approximately 70% by weight, with the balance of the composite layer 44 principally being a mixture of metal oxides and metal sulfides of TABLE 2 and other materials as described in TABLE 1.

Figure 5:
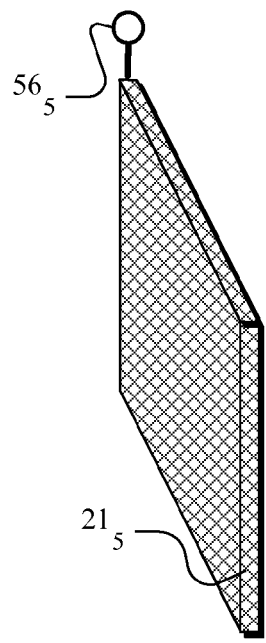
FIG. 5 depicts an electroactive material having nanoparticles and having a terminal electrically coupled to the particles for charge transport.

FIG. 5 depicts an electroactive material $21_5$ having nanoparticles and having a terminal 565 electrically coupled to the particles for charge transport. The terminal 565 functions as an electrode for allowing charge transport to and from the particles forming the nanomaterial $21_5$.

Figure 6:
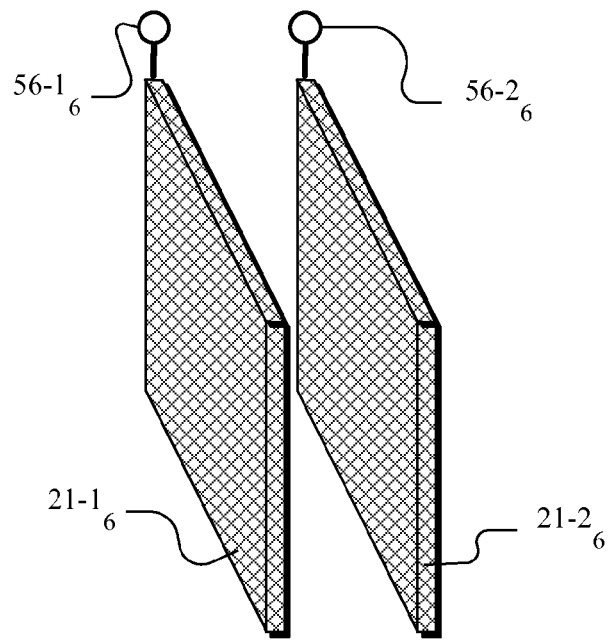
FIG. 6 depicts a device including first and second electroactive materials of the FIG. 5 type, each having nanoparticles and having a terminal electrically coupled to the particles for charge transport.

FIG. 6 depicts a device including first and second electroactive materials $21\text{-}1_6$ and $21\text{-}2_6$ of the FIG. 5 type, each having nanoparticles and having terminals $56\text{-}1_6$ and $56\text{-}2_6$ electrically coupled to the particles of the first and second electroactive materials $21\text{-}1_6$ and $21\text{-}2_6$, respectively, for charge transport.

Figure 7:
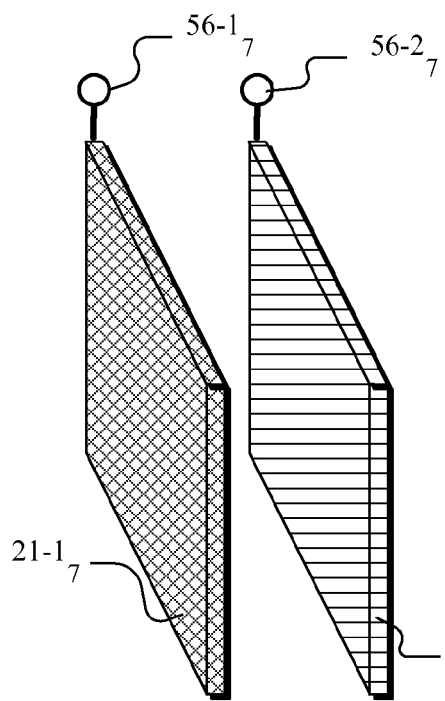
FIG. 7 depicts a device including a first electroactive material including a second electroactive material, different from the first electroactive material, having nanoparticles and having a terminal electrically coupled to the particles for charge transport.

FIG. 7 depicts a device including a first electroactive material electroactive material $21\text{-}1_7$ of the FIG. 5 type and having terminals 56-1₇ and including a second electroactive material 21-2₇, different from the first electroactive material, having nanoparticles and having a terminal 56-2₇ electrically coupled to the particles for charge transport.

Figure 8:
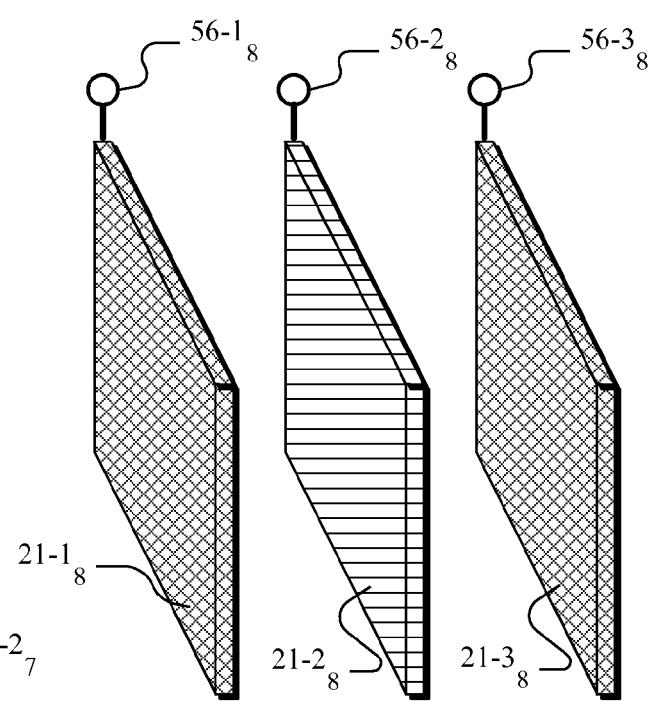
FIG. 8 depicts a device including first and second electroactive materials and including a third electroactive material, like the first electroactive material and having nanoparticles and having a terminal electrically coupled to the particles for charge transport.

FIG. 8 depicts a device a device including first and second electroactive materials 21-1₈ and 21-2₈ of the FIG. 5 type, each having nanoparticles and having terminals 56-1₈ and 56-2₈ electrically coupled to the particles of the first and second electroactive materials 21-1₈ and 21-2₈, respectively, for charge transport and including a third electroactive material 21-3₈, like the first electroactive material and having nanoparticles and having a terminal 56-3₈ electrically coupled to the particles for charge transport.

Figure 9:
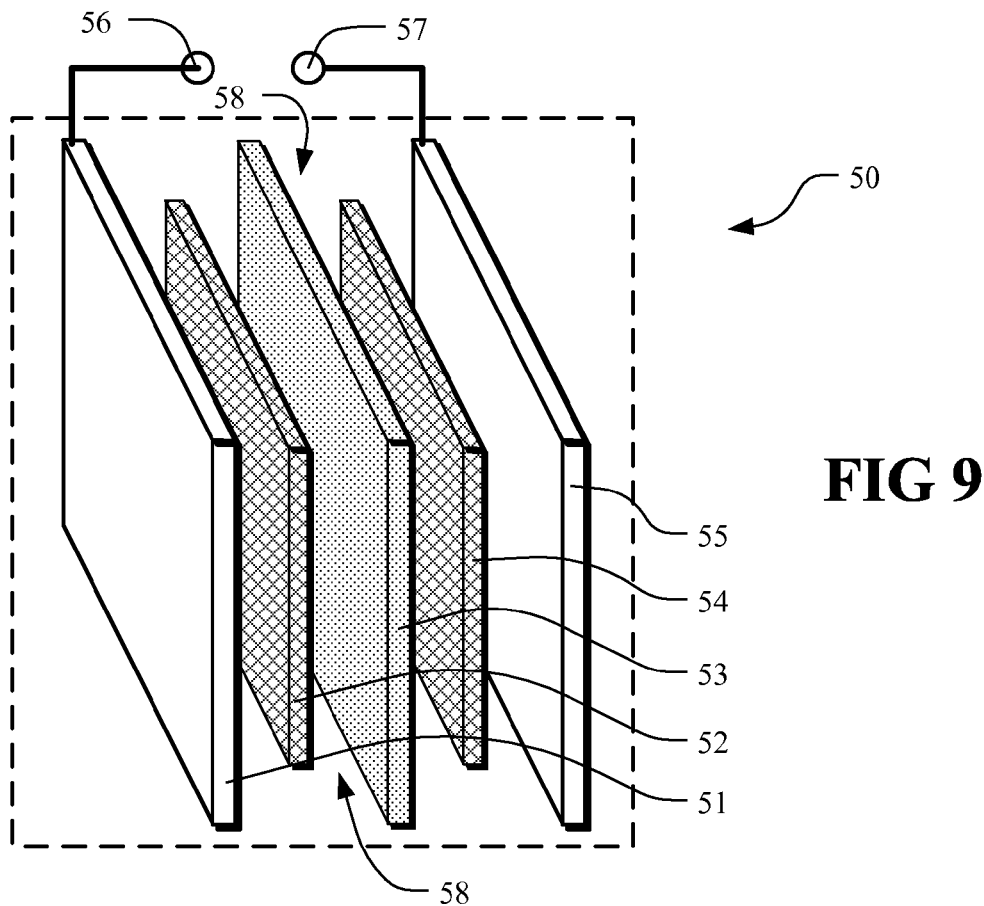
FIG. 9 depicts a schematic expanded representation of an electrochemical capacitor having one electrode formed of particles including composites having zinc sulfide nanoclusters (anode) and another electrode formed of particles including composites having zinc sulfide nanoclusters (cathode).

In FIG. 9, a schematic representation of an electrochemical capacitor 50 is shown having one electrode (anode) 52 and another electrode (cathode) 54. The anode 52 is formed of particles 21 as described in connection with FIG. 1, FIG. 2 and FIG. 3 and includes cluster 30 and specifically cluster 30-1 having zinc sulfide nanoclusters 32. The cathode 54 is formed of particles 21 as described in connection with FIG. 1, FIG. 2 and FIG. 3 and includes cluster 30 and specifically cluster 30-2 having zinc sulfide nanoclusters 32.

In FIG. 9, the electrode (anode) 52 and electrode (cathode) 54 are immersed in a solution 58 which in one example is 38% potassium hydroxide, KOH, in water. A separator 53 is provided between the anode 52 and the cathode 54. The separator 53 is a membrane which pre-vents any carbon transfer or contact between the anode 52 and the cathode 54 while permitting the transport of electrolyte ions. The anode 52 contacts a metal or other good-conducting material 51 to enable electron flow at terminal 56. The cathode 54 contacts a metal or other good-conducting terminal connector 55 to enable electron flow at contact 57. The capacitor elements 51, 52, 53, 54 and 55 are schematically shown with exaggerated spacing for clarity in the description and ease of viewing the drawing.

Figure 10:
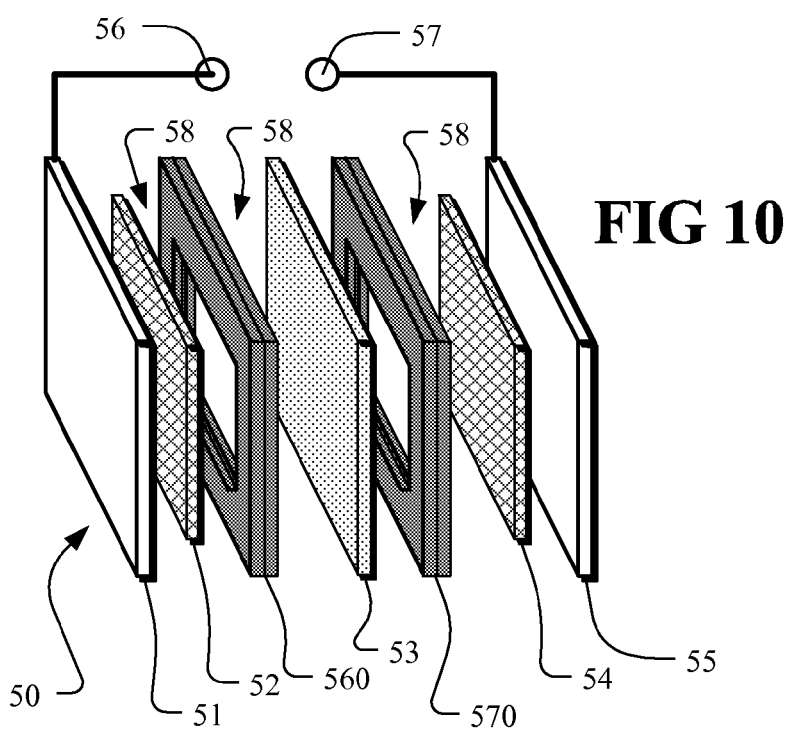
FIG. 10 depicts a schematic expanded representation of a electrochemical capacitor of the FIG. 9 type having added spacers

In FIG. 10, a schematic representation of capacitor 50 of FIG. 9 is shown having the addition of spacers 560 and 570. The spacer 560 is between the anode 52 and the membrane separator 53. The spacer 570 is between the cathode 54 and the membrane separator 53. The spacers 560 and 570 help establish the thickness of the capacitor 50 and also provide hermetic seals that constrain the electrolyte 58. The capacitor elements 51, 52, 53, 54, 55, 560 and 570 are schematically shown with exaggerated spacing for clarity in the description and ease of viewing the drawing.

Figure 11:
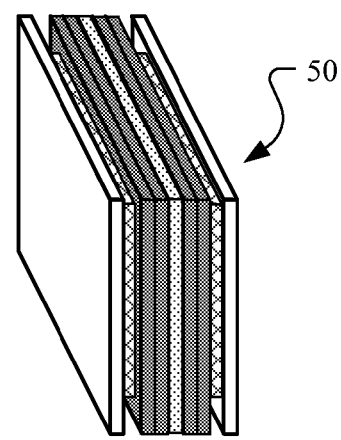
FIG. 11 depicts a schematic collapsed representation of the electrochemical capacitor of the FIG. 10.

In FIG. 11, a schematic representation of capacitor 50 of FIG. 6 is shown without expanded spacing.

Figure 12:
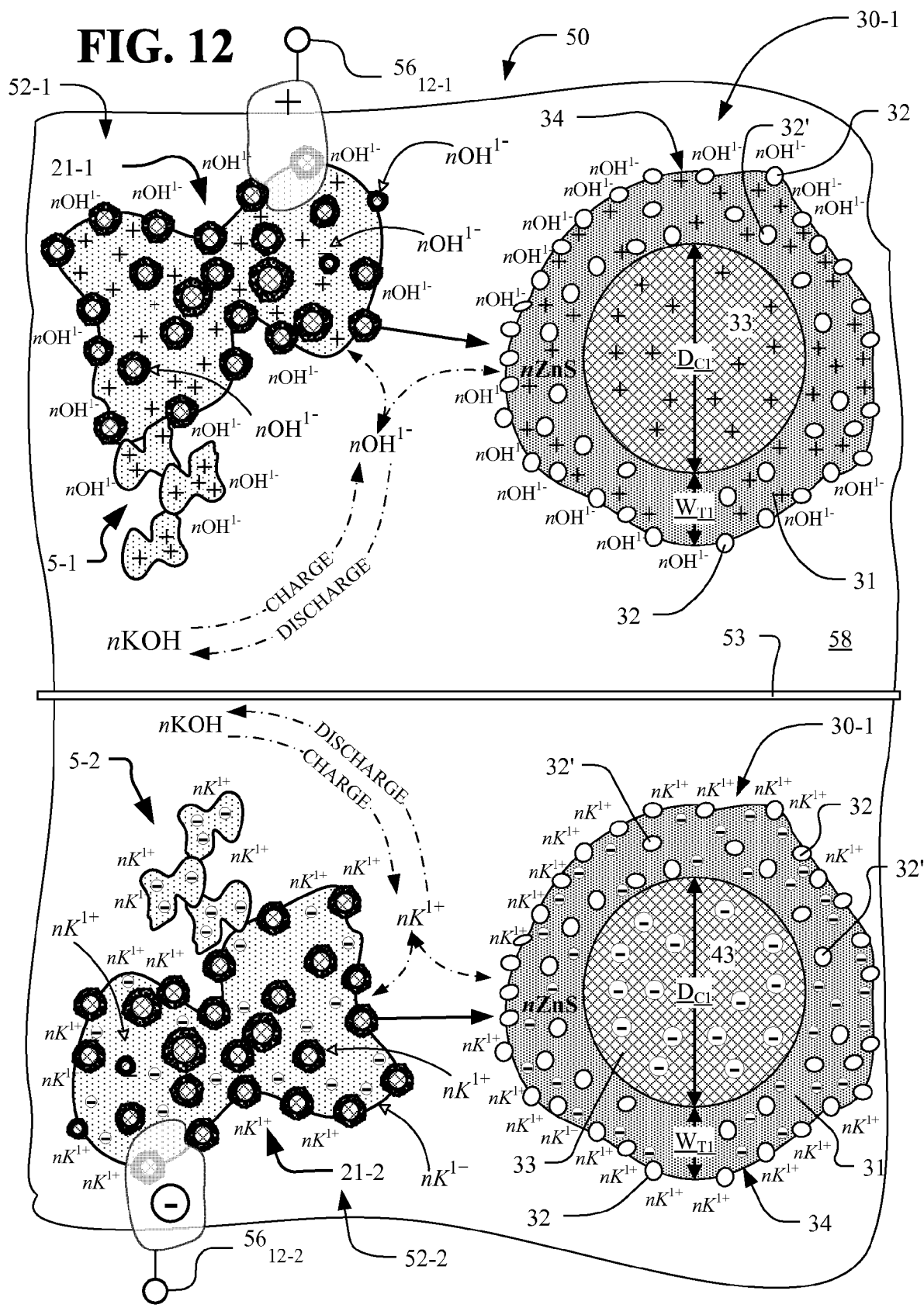
FIG. 12 depicts a representation of an anode and cathode formed of electroactive materials.

In FIG. 12, the capacitor 50 shown in FIG. 9, FIG. 10 and FIG. 11 is shown with greater details of the nanoscale structure of the materials and of the charge transport.

In FIG. 12, the capacitor 50 includes a first electroactive electrode 52-1 including a material 5-1 formed of plurality of particles 21-1. Each includes a plurality of clusters, of which cluster 30-1 is typical. Each cluster includes a carbon nanosphere core 33, a composite layer 34 surrounding and bound to the carbon nanosphere core 33. The composite layer 34 includes zinc sulfide nanoclusters 32 embedded in the composite layer 34, and a binding composite 31 binding the plurality of nanoclusters 32. A first terminal 56₁₂₋₁ electrically couples to the first plurality of particles 21-1 for charge transport.

A second electroactive electrode electroactive electrode 52-2 including a material 5-2 formed of plurality of particles 21-2. Each includes a plurality of clusters, of which cluster 30-2 is typical. Each cluster includes a carbon nanosphere core 33, a composite layer 34 surrounding and bound to the carbon nanosphere core 33. The composite layer 34 includes zinc sulfide nanoclusters 32 embedded in the composite layer 34, and a binding composite 41 binding the plurality of nanoclusters 32. A second terminal 56₁₂₋₂ electrically couples to the first plurality of particles 21-2 for charge transport.

A separator 53 is provided between the first electrode 52-1 and the second electrode 52-2. An electrolyte 58 contacts the first electrode 52-1 and the second electrode 52-2 for transporting electrical charges between the first electrode 52-1 and the second electrode 52-2 using electrolyte ions.

In general in FIG. 12, the electroactive electrodes 52-1 and 52-2 undergo reactions that take place in an electrolyte solution 58, for example KOH, at the interfaces of the electroactive electrodes 52-1 and 52-2 using electrolyte ions. Electrons transfer between the electroactive electrodes 52-1 and 52-2 and the electrolyte solution 58 or dissociated species of the electrolyte, $nK^{1+}$ and $nOH^{1-}$.

When terminals 56₁₂₋₁ and 56₁₂₋₂ are connected to an external circuit (not shown), the electrolyte solution 58 reacts with the material 5-1 and particularly the particles 21-1, clusters 30-1. For each cluster 30-1, the electrolyte solution 58 reacts with the nanoclusters 32 and couples directly with the composite layer 34, the nanocluster binder 31 and the carbon nanosphere core 33. The electrolyte is in one example potassium hydroxide, KOH.

The process of electron production involves the species $nOH^{1-}$ from solution contacting a cluster such as cluster 30-1. For each cluster the species $nOH^{1-}$ balances the charges imposed on the nanoclusters 32, nanocluster binder 31 and the carbon nanosphere core 33 to form the ionic double layer. The reaction of the species $nOH^{1-}$ is efficient when the electrolyte solution 58 is in contact with the surface located nanoclusters clusters 32 and nanocluster binder 31 and hence where the diffusion path of the species $nOH^{1-}$ is short, typically 10 nanometers or less. Because the diffusion path of the species $nOH^{1-}$ is short, the diffusion rate is fast.

Additionally, the internal nanoclusters 32', the internal nanocluster binder 31 and the carbon nanosphere core 33 are efficiently coupled for electron production by reaction with the species $nOH^{1-}$ through intercalation and close proximity of the internal nanoclusters 32', the internal nanocluster binder 31 and the carbon nanosphere core 33. Again, the intercalation distance is short, typically 80 nanometers or less and hence the intercalation rate is fast.

The process of electron recombination involves the ion $nOH^{1}$ from solution contacting a cluster such as cluster 30-2. For each cluster 30-2, the ion $nOH^{1-}$ reacts with nanoclusters 32 and with nanocluster binder 41 and with the carbon nanosphere core 33. The reaction of the ion $nOH^{1-}$ is efficient when the electrolyte solution 58 is in contact with the surface located nanoclusters clusters 32, zinc sulfide clusters and nanocluster binder 31. Because the diffusion path of the species the ion $nOH^{1-}$ is short, typically 10 nanometers or less, the diffusion rate is fast.

For recharging operation, the process is the reverse of electron production. The recharging operation involves the species $nOH^{1-}$ from solution contacting a cluster such as cluster 30-2. For each cluster the species $nOH^{1-}$ reacts with nanoclusters 32, with nanocluster binder 31 and with the carbon nanosphere core 33. The reaction of the species $nOH^{1-}$ is efficient when the electrolyte solution 58 is in contact with the surface located nanoclusters clusters 32 and nanocluster binder 31 and hence where the diffusion path of the species $nOH^{1-}$ is short, typically 10 nanometers or less. Because the diffusion path of the species $nOH^{1-}$ is short, the diffusion rate is fast.

Additionally, the internal nanoclusters 32', the internal nanocluster binder 31 and the carbon nanosphere core 33 are efficiently coupled for electron production by reaction with the species $nOH^{1-}$ through intercalation and close proximity of the internal nanoclusters 32', the internal nanocluster binder 31 and the carbon nanosphere core 33. Again, the intercalation distance is short, typically 80 nanometers or less and hence the intercalation rate is fast.

At the cathode, the species, the species $nK^{1+}$ has interacted with ZnS.

The process of electron recombination involves the ion $nK^{1+}$ from solution contacting a cluster such as cluster 30-1. For each cluster 30-1, the ion $nK^{1+}$ reacts with nanoclusters 32, and with nanocluster binder 31 and with the carbon nanosphere core 33. The reaction of the ion $nK^{1+}$ is efficient when the electrolyte solution 58 is in contact with the surface located nanoclusters clusters 32, zinc sulfide clusters and nanocluster binder 31. Because the diffusion path of the species the ion $nK^{1+}$ is short, typically 10 nanometers or less, the diffusion rate is fast.

The nanomaterial 5 is formed of a plurality of nanocomponents including nanoparticles 21, in turn formed of conductive carbon-based clusters 30 bound together by a conductive carbon-based cluster binder 22 including zinc sulfide nanoclusters 32 and nanocluster binders, all having high densities of mobile charge carriers (electrons, electronic acceptors, ionic species).

The nanomaterial 5, and each of the nanocomponents, plays a key role in the process of charge transport including supplying electrons (at the anode 52-1 and 52-2). The charge transport occurs by the electron travel through the highly conductive and relatively short path of the binders 22 and 31 with proximity to the nanoclusters 32. The small sizes of the particles 21 provide large surface areas. In general, particle sizes of less than about 100 nanometers are preferred in order to have large surface areas which provide ready access of the electrolyte 58 to all the nanocomponents of the particles 21. The combination of the high density of available electrons in all the nanocomponents of the particles 21 with the short distances among all the nanocomponents of the particles 21 and the large surface areas of the nanocomponents greatly enhances the energy and power densities achieved.

Because of the short nanodistances of the particles of the present invention, the density of clusters producing electrons tends to be high resulting in high energy densities greater than 100 watt-hours/kilogram. Because of the short nanodistances of the particles of the present invention, the intercalation rate is fast resulting in high power densities, for example, greater than 2000 watts/kilogram.

This efficiency of the production of electrons with the nanostructure elements of the present invention is distinguished from the inefficiency in conventional batteries where the electrodes are formed with materials having larger-sized particles and where the intercalation distance is long, typically 800 nanometers or more and the intercalation rate is slow.

The electron transfer can occur at an electrode through the release of chemical energy to create an internal voltage or through the application of an external voltage.

Figure 13:
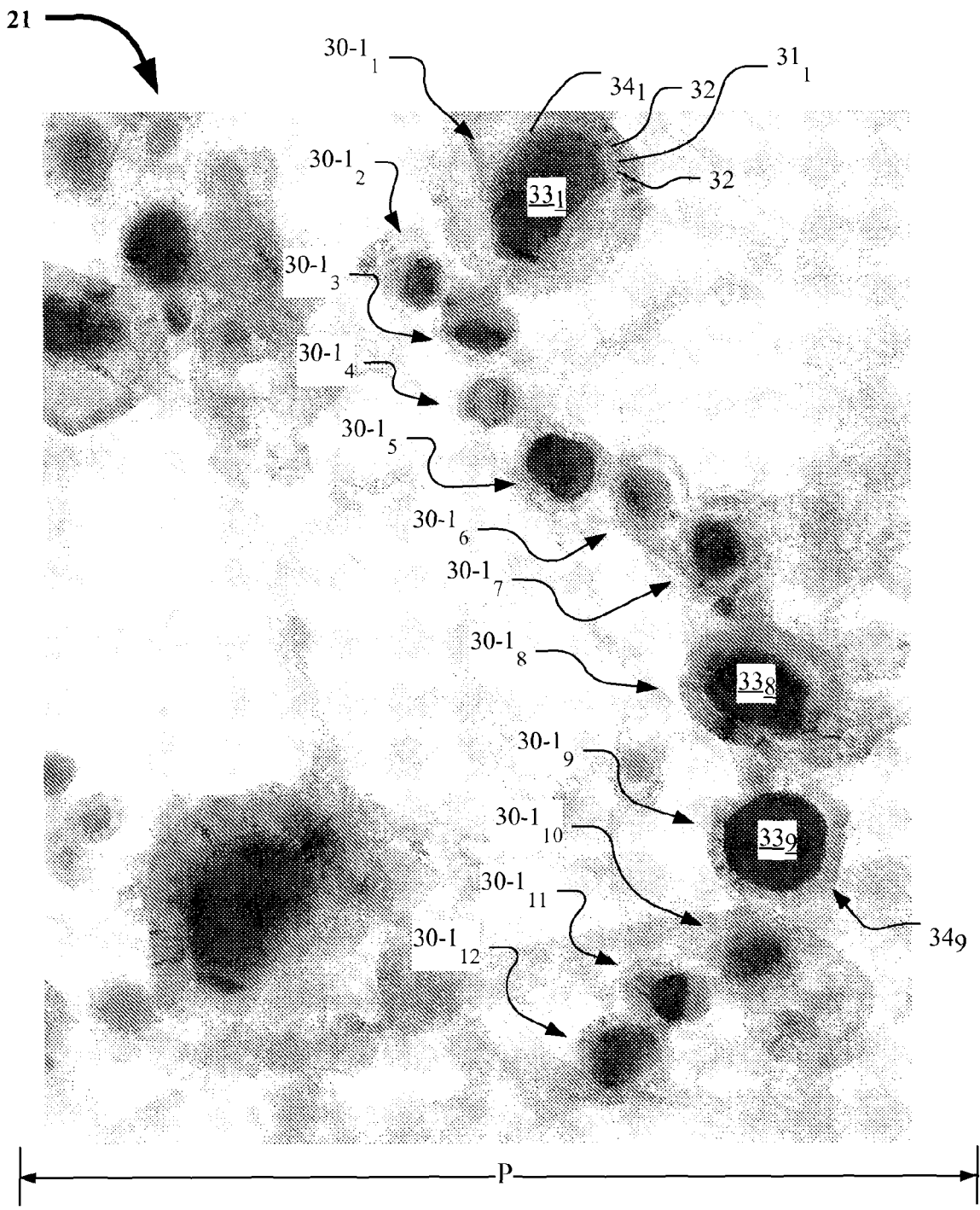
FIG. 13 depicts an electron-microscope scan of a particle including composites having zinc sulfide nanoclusters.

FIG. 13 depicts an electron-microscope scan of a particle 21 including composites having zinc sulfide nanoclusters. The particle 21 has a dimension P that is typically less than 100 nanometers, approximately $1 \times 10^{-7}$ meters. The electron-microscope scan of FIG. 13 was produced with 60,000× magnification using a Transmission Electron Microscope with a scan time of approximately one minute. A slide was prepared by dissolving 1 milligram of material into 20 milliliters of methanol in a scintillation vial, sonicating for 5 minutes and placing a 70 micro liter aliquot drop onto a TEM copper grid for imaging. The grid is then covered and placed in an environmental chamber to evaporate the methanol. The example of FIG. 13 is typical of many samples.

In FIG. 13, a plurality of zinc-sulfide clusters 30-1 are shown, including among others clusters $30\text{-}1_1$, $30\text{-}1_2$, $30\text{-}1_3$, $30\text{-}1_4$, ..., $30\text{-}1_{12}$. By way of example, the cluster $30\text{-}1_1$ includes a carbon nanosphere core 33, surrounded by a composite layer 34, having a large number of nanoclusters 32 (only two of which are labeled but includes many more as a function of the zinc sulfide packing density) held together by a nanocluster binder $31_1$. Each of the others clusters $30\text{-}1_1$, $30\text{-}1_2$, $30\text{-}1_3$, $30\text{-}1_4$, ..., $30\text{-}1_{12}$ has similar structures.

In FIG. 13, the plurality of zinc-sulfide nanoclusters $30\text{-}1_1$, $30\text{-}1_2$, $30\text{-}1_3$, $30\text{-}1_4$, ..., $30\text{-}1_{12}$ are arrayed in a structure that couples the nanoclusters 30-1 for energy transfer (electrical, thermal, photon, mechanical and other). It is evident in FIG. 13 that nanoclusters $30\text{-}1_1$, $30\text{-}1_2$, $30\text{-}1_3$, $30\text{-}1_4$, ..., $30\text{-}1_{12}$ are linked together to form a serial chain whereby the composite layer 34 of one cluster are in close proximity to the composite layer 34 of one or more adjacent nanoclusters. With such close proximity of composite layers 34, energy transfer is readily facilitated from adjacent to adjacent nanoclusters. It is highly desirable to have linking of nanostructures to provide the enhanced performance that derives from efficient electrical coupling and charge transport. The linking is achieved by close proximity binding of the clusters with conductive composite binders. The linking is further enhanced by the structure of the nanoclusters based upon carbon nanocores encased in a conductive carbon-based nanocluster binder. This linking is achieved as a result of the control of char formation in tire pyrolysis. This linking in the present invention is superior to nanotube technology where the linking is not in-situ provided, but must be added at great expense and with high difficulty.

FIG. 13 is a planar view of a thin plane of nanomaterial representing a monolayer of material, but it should be noted that the close proximity of the composite layers 34 occurs in three dimensions of a volume of material.

The close proximity of composite layers 34 and the resultant high energy transfer characteristics of the nanomaterials are determined as a function of the processing times, temperatures and pressures during pyrolysis of tires.

Figure 14:
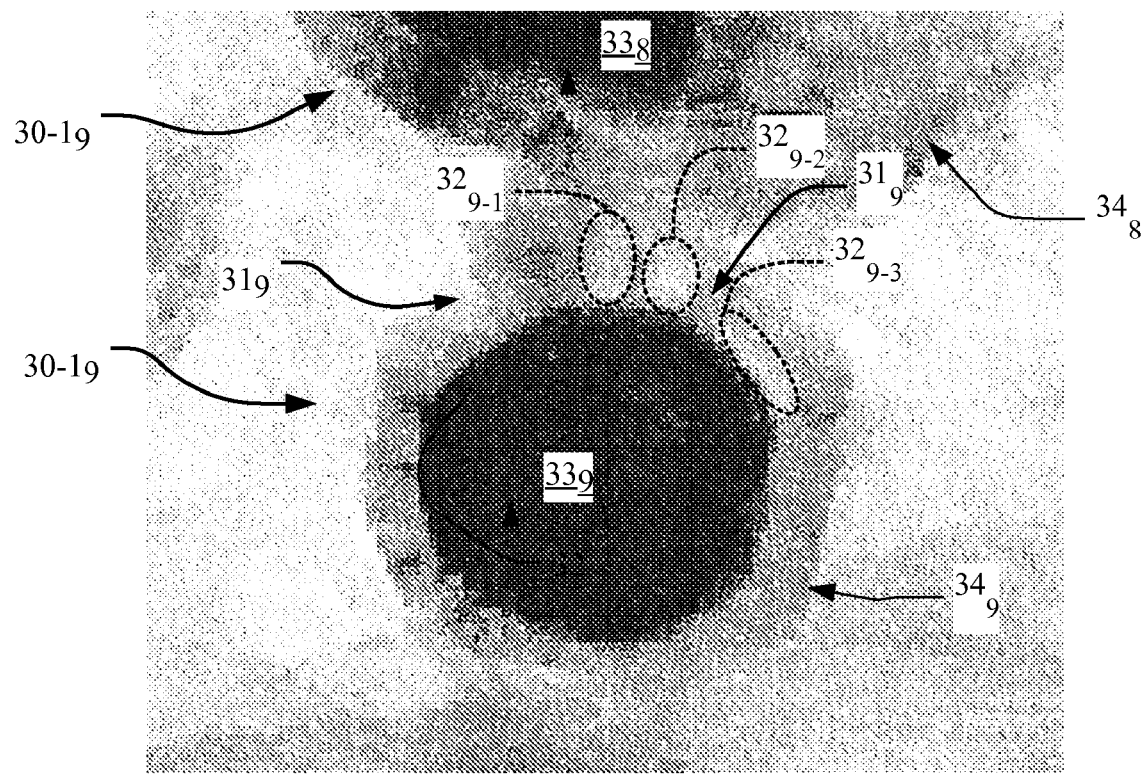
FIG. 14 depicts an electron-microscope scan of one of the nanoclusters of FIG. 13.

FIG. 14 depicts an enlarged view of a portion of the electron-microscope scan of the cluster $30\text{-}1_9$ adjacent to and in close proximity to the cluster $30\text{-}1_8$ of FIG. 13. The composite layers $34_8$ and $34_9$ of clusters $30\text{-}1_8$ and $30\text{-}1_9$ are in close proximity. The cluster $30\text{-}1_9$ includes, by way of example, nanoclusters $32_{9\text{-}1}$, $32_{9\text{-}2}$ and $32_{9\text{-}3}$. The nanoclusters $32_{9\text{-}1}$, $32_{9\text{-}2}$ and $32_{9\text{-}3}$ are bound together in the composite layer $34_9$ by the nanocluster binder $31_9$. The zinc sulfide properties of the nanoclusters $32_{9\text{-}1}$, $32_{9\text{-}2}$ and $32_{9\text{-}3}$ are identified by in-situ x-ray backscattering images observed during the scan. The other materials present (not shown in FIG. 14) include many of the materials of TABLE 2 in varying concentrations that are generally less than the concentration of zinc sulfide. The concentration of pyrolitic carbon is typically greater than the concentration of zinc sulfide. The pyrolitic carbon in the composite 34 facilitates the ion formation and charge transport. The other materials of TABLE 2 may also play a contributing role to the operation.

Figure 15:
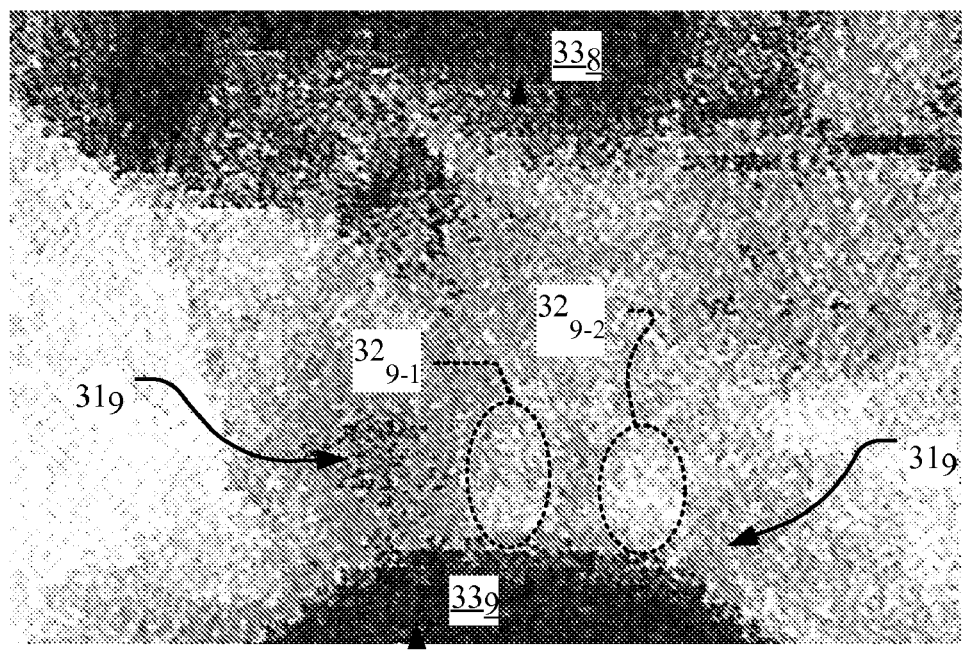
FIG. 15 depicts an electron-microscope scan showing further details of the nanocluster of FIG. 14.

FIG. 15 depicts an electron-microscope scan showing further details of the nanocluster of FIG. 14.

Figure 16:
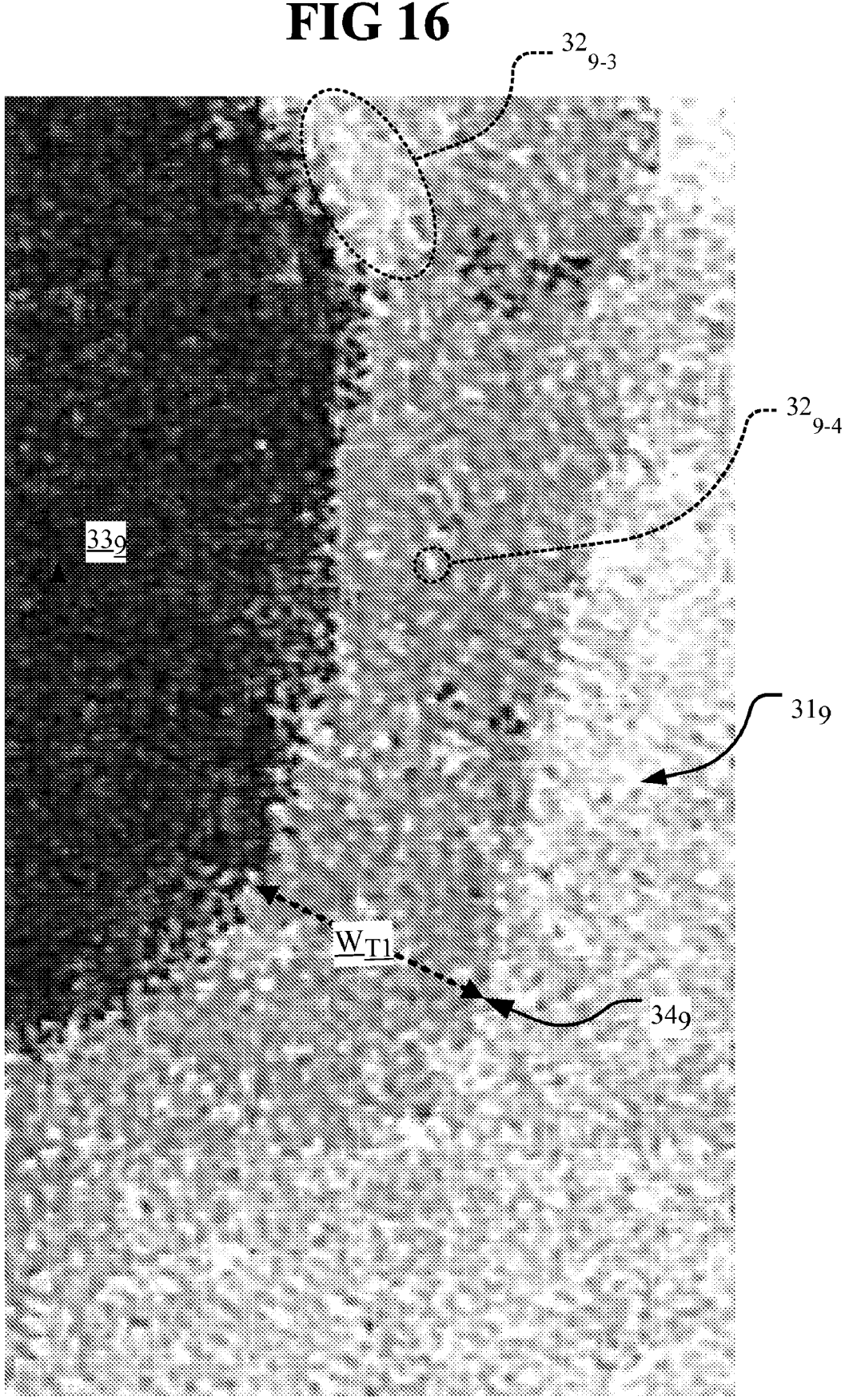
FIG. 16 depicts an electron-microscope scan showing even further details of the nanocluster of FIG. 15.

FIG. 16 depicts an electron-microscope scan showing even further details of the nanocluster of FIG. 15. The nanocluster $32_{9\text{-}3}$ is much larger than the nanocluster $32_{9\text{-}4}$ and demonstrates that the zinc sulfide nanocluster have widely varying size distributions.

The manufacturing process for forming electrochemical capacitors from tire char, in one embodiment, is as follows. The carbon char from pyrolyzed tires is ground or otherwise formed into a fine powder with a particle size distribution that includes a substantial number of small particles, that is, particles measuring less than 100 nanometers. The resultant fine powder is mixed with an electrolyte solution consisting of approximately 38% NaOH in distilled water at a ratio of 4 g fine powder (carbon) to 3.5 g of electrolyte. This carbon/electrolyte mixture is then ground (if done by hand using a mortar and pestle) for approximately 10 minutes or until the electrode material has a smooth consistency. The ground electrode material can be stored for weeks or more in a sealed container.

Capacitors are assembled by rolling out the electrode material in a thin layer onto a current collector which, for example, is 316 stainless steel foil supported by a rigid member such as plate glass. A separator is placed atop the thin layer of electrode material. The separator consists of an ion permeable, electrically insulating membrane (Pall Rai membrane) which is pre-saturated with electrolyte solution by soaking in the electrolyte solution for longer than 30 minutes. Another layer of electrode material is placed atop the insulating membrane to form a symmetrical electrode, followed by a collector plate. The capacitor layers are then compressed, for example using clips, sealed with epoxy and allowed to cure at 50° C. for an hour. After the epoxy has cured, the binder clips are removed. The resulting electrochemical capacitors are tested.

The capacitors are tested by first charging to 0.75V until the current required to maintain this charge level falls below 1 milliamp. The capacitors are then cycled through charge/discharge cycles whereby the charging current is reversed until the potential at the collector reaches 0V. Then the current is switched to charge the capacitors back to their previous potential. The time required to discharge and recharge the cell is recorded as is the current used and the total voltage change. These values along with the carbon mass in each electrode are used to calculate the energy stored in the cell.

While the invention has been particularly shown and described with reference to preferred embodiments thereof it will be understood by those skilled in the art that various changes in form and details may be made therein without departing from the scope of the invention.

The invention claimed is:

1. An electroactive material for charge transport in an electrochemical capacitor comprising,
   a first plurality of particles, each particle including,
      a plurality of clusters, each cluster including,
         a carbon nanosphere core,
         a composite layer surrounding and bound to the nanosphere core, the composite layer including zinc sulfide nanoclusters embedded in the composite layer, and
      a binding composite binding the plurality of clusters,
   a first terminal electrically coupled to the first plurality of particles for charge transport.

2. The electroactive material of claim 1 further including,
   a second plurality of particles, each particle including,
      a plurality of clusters, each cluster including,
         a carbon nanosphere core,
         a composite layer surrounding and bound to the nanosphere core, the composite layer including nanoclusters embedded in the composite layer, and
      a binding composite binding the plurality of clusters,
   a second terminal electrically coupled to the second plurality of particles for charge transport.

3. The electroactive material of claim 2 wherein the second plurality of particles are substantially the same as the first plurality of particles including zinc sulfide nanoclusters.

4. The electroactive material of claim 2 wherein the second plurality of particles are substantially different from the first plurality of particles including zinc sulfide nanoclusters.

5. The electroactive material of claim 4 wherein the zinc sulfide nanoclusters are charge receptors or charge donors and wherein charge transport uses electrolyte ions.

6. The electroactive material of claim 2 wherein the second plurality of particles are separated from the first plurality of particles by an ion permeable membrane.

7. The electroactive material of claim 2 wherein the carbon nanosphere core have a diameter of less than approximately 100 nanometers.

8. The electroactive material of claim 2 wherein the composite layer has a wall thickness of less than approximately 1200 nanometers.

9. The electroactive material of claim 2 wherein a substantial number of the clusters have a diameter of less than approximately 1200 nanometers.

10. A electrochemical capacitor comprising,
   a first electroactive electrode including,
      a first plurality of particles, each particle including,
         a plurality of clusters, each cluster including,
            a carbon nanosphere core,
            a composite layer surrounding and bound to the nanosphere core, the composite layer including zinc sulfide nanoclusters embedded in the composite layer, and
         a binding composite binding the plurality of clusters,
      a first terminal electrically coupled to the first plurality of particles for charge transport,
   a second electroactive electrode including,
      a second plurality of particles, each particle including,
         a plurality of clusters, each cluster including,
            a carbon nanosphere core,
            a composite layer surrounding and bound to the nanosphere core, the composite layer including zinc sulfide nanoclusters embedded in the composite layer, and
         a binding composite binding the plurality of clusters,
      a second terminal electrically coupled to the second plurality of particles for charge transport,
   a separator between the first electrode and the second electrode,
   an electrolyte contacting the first and second electrodes for charge transport between the first and second electrodes using electrolyte ions.

11. The electrical device of claim 10 wherein the zinc sulfide nanoclusters facilitate transport of charges for discharging and for recharging.

12. The electrical device of claim 10 wherein the composite layer is conductive to electrically couple the nanosphere core to the zinc sulfide nanoclusters to provide high energy density.

13. The electrical device of claim 10 wherein the first electroactive electrode and the second electroactive electrode are formed of tire char and wherein the composite layers for the first and second electroactive electrodes are conductive to electrically couple the nanosphere cores to the nanoclusters to provide high energy density and high power density.

14. The electrical device of claim 10 wherein the first electroactive electrode and the second electroactive electrode are formed of tire char and are heavy-metal free and wherein the composite layers for the first and second electroactive electrodes are conductive to electrically couple the nanosphere cores to the nanoclusters to provide high energy density and high power density.

15. The electrical device of claim 10 wherein the first electroactive electrode and the second electroactive electrode are formed of tire char and are heavy-metal free and wherein the composite layers for the first and second electroactive electrodes are conductive to electrically couple the nanosphere cores to the nanoclusters to provide high energy density and where the zinc sulfide nanoclusters facilitate discharging and recharging.

16. The electrical device of claim 10 wherein the first electroactive electrode and the second electroactive electrode are entirely tire char.

17. An electroactive material for charge transport in an electrochemical capacitor comprising,
   a plurality of nanocomponents including nanoparticles formed of conductive carbon-based clusters bound together by a conductive carbon-based cluster binder and including nanoclusters and nanocluster binders, the nanocomponents having high densities of mobile charge carriers, the nanocomponents in combination supply high densities of electrons and electron acceptor sites for facilitating electron travel through the binders with proximity to the nanoclusters,
   a terminal electrically coupled to the nanoparticles for charge transport.

18. The electroactive material of claim 17 wherein the nanoparticles provide large surface areas including particle sizes of less than about 100 nanometers for providing ready access of an electrolyte to the nanocomponents to enhance energy and power densities.

19. The electroactive material of claim 18 further including,
   a second plurality of nanocomponents including nanoparticles formed of conductive carbon-based clusters bound together by a conductive carbon-based cluster binder and including nanoclusters and nanocluster binders, the second plurality of nanocomponents having high densities of mobile charge centers, the second plurality of nanocomponents in combination supply high densities of electrons and electron acceptor sites for facilitating electron travel through the binders with proximity to the nanoclusters,
   a second terminal electrically coupled to the nanoparticles of the second plurality of nanocomponents for charge transport.

* * * * *